United States Patent
Phillips et al.

(10) Patent No.: US 10,515,348 B2
(45) Date of Patent: Dec. 24, 2019

(54) AGGREGATION OF AUTOMATED TELLER MACHINE (ATM) DEVICE-RELATED INFORMATION AND/OR FACTOR-BASED SELECTION OF AN ATM DEVICE

(71) Applicant: Capital One Services, LLC, McLean, VA (US)

(72) Inventors: Jeremy Phillips, Brooklyn, NY (US); Zhe Liu, McLean, VA (US); Kurry Tran, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 110 days.

(21) Appl. No.: 15/811,323

(22) Filed: Nov. 13, 2017

(65) Prior Publication Data
US 2019/0147421 A1    May 16, 2019

(51) Int. Cl.
*G06Q 20/10* (2012.01)
*H04L 29/08* (2006.01)
(Continued)

(52) U.S. Cl.
CPC ... *G06Q 20/1085* (2013.01); *G06F 16/24578* (2019.01); *G07F 19/209* (2013.01);
(Continued)

(58) Field of Classification Search
None
See application file for complete search history.

(56) References Cited

U.S. PATENT DOCUMENTS 9,389,090 B1 *   7/2016   Levine .................. G01C 21/362
2010/0004005 A1 *  1/2010   Pereira .................. H04W 4/029
                                                              455/457
(Continued)

FOREIGN PATENT DOCUMENTS

IN      4361CH2011 A  *  6/2013
WO   WO-2018189165 A1 * 10/2018   ......... G06Q 20/1085

OTHER PUBLICATIONS

M. Lončar, J. A. Aldan and M. Ivašić-Kos, "Mobile application for finding ATMs," 2015 38th International Convention on Information and Communication Technology, Electronics and Microelectronics (MIPRO), Opatija, 2015, pp. 1638-1642. (Year: 2015).*
(Continued)

*Primary Examiner* — Bennett M Sigmond
*Assistant Examiner* — Bolko M Hamerski
(74) *Attorney, Agent, or Firm* — Harrity & Harrity, LLP

(57) ABSTRACT

A device may receive, from automated teller machine (ATM) devices, information related to a capability of each of the ATM devices to provide cash, or a fee to be charged by each of the ATM devices in association with providing the cash. The device may receive, from a user device, a request to identify an ATM device of the ATM devices. The device may determine scores for the ATM devices based on the information related to the capability of the one of the ATM devices or the fee to be charged by the one of the ATM devices. The device may determine a rank for the ATM devices based on the scores for the ATM devices. The device may provide, to the user device and based on the rank, information identifying the ATM device or one or more other ATM devices of the ATM devices.

20 Claims, 5 Drawing Sheets

(51) Int. Cl.
*G07F 19/00* (2006.01)
*G06F 16/2457* (2019.01)

(52) U.S. Cl.
CPC ............ *G07F 19/211* (2013.01); *H04L 67/18* (2013.01); *H04L 67/2838* (2013.01); *H04L 67/327* (2013.01)

(56) References Cited

U.S. PATENT DOCUMENTS

| | | | |
|---|---|---|---|
| 2011/0087530 A1 | 4/2011 | Fordyce, III et al. | |
| 2011/0184865 A1* | 7/2011 | Mon et al. | G06Q 20/1085 705/43 |
| 2011/0231258 A1 | 9/2011 | Winters | |
| 2012/0303448 A1* | 11/2012 | Psillas | G06Q 40/02 705/14.49 |
| 2013/0024307 A1 | 1/2013 | Fuerstenberg et al. | |
| 2013/0191195 A1 | 7/2013 | Carlson et al. | |
| 2013/0339235 A1* | 12/2013 | Tulluri | G06Q 20/10 705/43 |
| 2014/0324725 A1* | 10/2014 | Edmonds | G06Q 10/0835 705/333 |
| 2015/0134675 A1* | 5/2015 | Ellis | G06F 16/335 707/754 |
| 2016/0078416 A1* | 3/2016 | DeLuca | G06Q 20/1085 705/43 |
| 2016/0078417 A1* | 3/2016 | DeLuca | G06Q 20/1085 701/23 |
| 2016/0086143 A1* | 3/2016 | Hao | G06Q 20/1085 705/43 |
| 2016/0104112 A1* | 4/2016 | Gorlin | G06F 16/29 705/338 |
| 2017/0140353 A1* | 5/2017 | Burdick | G07F 19/209 |

OTHER PUBLICATIONS

R. C. Das, P. P. Purohit, T. Alam and M. Chowdhury, "Location based ATM locator system using OpenStreetMap," The 8th International Conference on Software, Knowledge, Information Management and Applications (SKIMA 2014), Dhaka, 2014, pp. 1-6. (Year: 2014).*

R. AlTawy, M. ElSheikh, A. M. Youssef and G. Gong, "Lelantos: A Blockchain-Based Anonymous Physical Delivery System," 2017 15th Annual Conference on Privacy, Security and Trust (PST), Calgary, AB, Aug. 1, 2017, pp. 15-24. (Year: 2017).*

* cited by examiner

AGGREGATION OF AUTOMATED TELLER MACHINE (ATM) DEVICE-RELATED INFORMATION AND/OR FACTOR-BASED SELECTION OF AN ATM DEVICE

BACKGROUND

An automated teller machine (ATM) device may include an electronic machine that enables a customer of a financial institution to perform a financial transaction. For example, a financial transaction may include a cash withdrawal, a money deposit, a money transfer, and/or the like. An ATM device may permit performance of a financial transaction without the need for a human cashier or bank teller. In some cases, an ATM device may identify a customer of the ATM device by reading a magnetic strip and/or a chip associated with a transaction card associated with the customer.

SUMMARY

According to some possible implementations, a device may comprise one or more memories; and one or more processors, communicatively coupled to the one or more memories, configured to receive, from a plurality of automated teller machine (ATM) devices, information related to at least one of: a capability of each of the plurality of ATM devices to provide cash, or a fee to be charged by each of the plurality of ATM devices in association with providing the cash. The one or more processors may be configured to receive, from a user device, a request to identify an ATM device, of the plurality of ATM devices, from which an individual associated with the user device can receive the cash. The one or more processors may be configured to determine, after receiving the request, scores for the plurality of ATM devices. A score for one of the plurality of ATM devices may be based on at least one of: the capability of the one of the plurality of ATM devices to provide the cash, the fee to be charged by the one of the plurality of ATM devices, or information identifying a preference of the individual. The one or more processors may be configured to determine a rank for the plurality of ATM devices based on the scores for the plurality of ATM devices. The one or more processors may be configured to provide, to the user device and based on the rank, information identifying the ATM device and/or one or more other ATM devices of the plurality of ATM devices.

According to some possible implementations, a non-transitory computer-readable medium may store one or more instructions that, when executed by one or more processors, cause the one or more processors to receive, from a plurality of automated teller machine (ATM) devices, information related to at least one of: a capability of each of the plurality of ATM devices to provide cash, or a fee to be charged by each of the plurality of ATM devices in association with providing the cash. The one or more instructions, when executed by the one or more processors, may cause the one or more processors to receive, from a user device, a request to identify an ATM device of the plurality of ATM devices. The one or more instructions, when executed by the one or more processors, may cause the one or more processors to determine, after receiving the request, scores for the plurality of ATM devices. A score for one of the plurality of ATM devices may be based on the information related to the capability of the one of the plurality of ATM devices or the fee to be charged by the one of the plurality of ATM devices. The one or more instructions, when executed by the one or more processors, may cause the one or more processors to determine a rank for the plurality of ATM devices based on the scores for the plurality of ATM devices. The one or more instructions, when executed by the one or more processors, may cause the one or more processors to provide, to the user device and based on the rank, information identifying the ATM device or one or more other ATM devices of the plurality of ATM devices.

According to some possible implementations, a method may include receiving, by a device and from a plurality of automated teller machine (ATM) devices, information related to the plurality of ATM devices. The method may include receiving, by the device and from a user device, a request to identify an ATM device, of the plurality of ATM devices, that can provide cash to an individual. The method may include determining, by the device and after receiving the request, scores for the plurality of ATM devices. A score for one of the plurality of ATM devices may be based on at least one of: a capability of the one of the plurality of ATM devices to provide the cash, a fee to be charged by the one of the plurality of ATM devices for providing the cash, or information identifying a preference of the individual. The method may include determining, by the device, a rank for the plurality of ATM devices based on the scores for the plurality of ATM devices. The method may include identifying, by the device, the ATM device based on the rank. The method may include providing, by the device and to the user device, information identifying the ATM device or one or more other ATM devices, of the plurality of ATM devices, after identifying the ATM device.

DETAILED DESCRIPTION

The following detailed description of example implementations refers to the accompanying drawings. The same reference numbers in different drawings may identify the same or similar elements.

An automated teller machine (ATM) device may charge a fee for various services provided by the ATM device, such as withdrawing money from the ATM device, depositing money into the ATM device, transferring money between accounts associated with one or more financial institutions, and/or the like. In some cases, multiple ATM devices may be located in a geographic area and the ATM devices may charge different fees for the services that the ATM devices provide. When an individual needs to select an ATM device to use, the individual may not have access to information that identifies fees for services provided by different ATM devices. For example, selecting one ATM device over another ATM device may result in the individual paying a higher fee for the same service. Additionally, or alternatively, and as another example, an individual may waste time and/or consume resources of a vehicle, such as fuel resources, traveling in a geographic area attempting to locate an ATM device that offers a threshold fee, offers a particular service, is compatible with a transaction card for which the individual is a card holder, and/or the like. Further, the individual may want to select an ATM device based on a combination of factors, such as a proximity to the individual, services offered by the ATM device, and/or the like but may lack access to this information.

Some implementations, described herein, provide an ATM recommendation platform that is capable of aggregating information from multiple ATM devices and processing the information according to one or more factors and/or preferences. In this way, the ATM recommendation platform may provide an individual with access to aggregated information related to the multiple ATM devices and may intelligently select an ATM device for the individual to use based on one or more factors, one or more preferences, and/or the like. This improves selection of an ATM device by an individual by permitting the individual to specify one or more factors, one or more preferences, and/or the like on which an ATM device is to be selected.

In addition, this reduces or eliminates situations where an individual pays higher fees for a service from an ATM device relative to a fee for the same service from another ATM device. Further, this conserves time of an individual and/or resources of a vehicle, such as fuel resources, that would otherwise be consumed by the individual traveling in a geographic area to identify an ATM device with fees that satisfy a threshold, that offers particular services, and/or the like.

Figure 1:
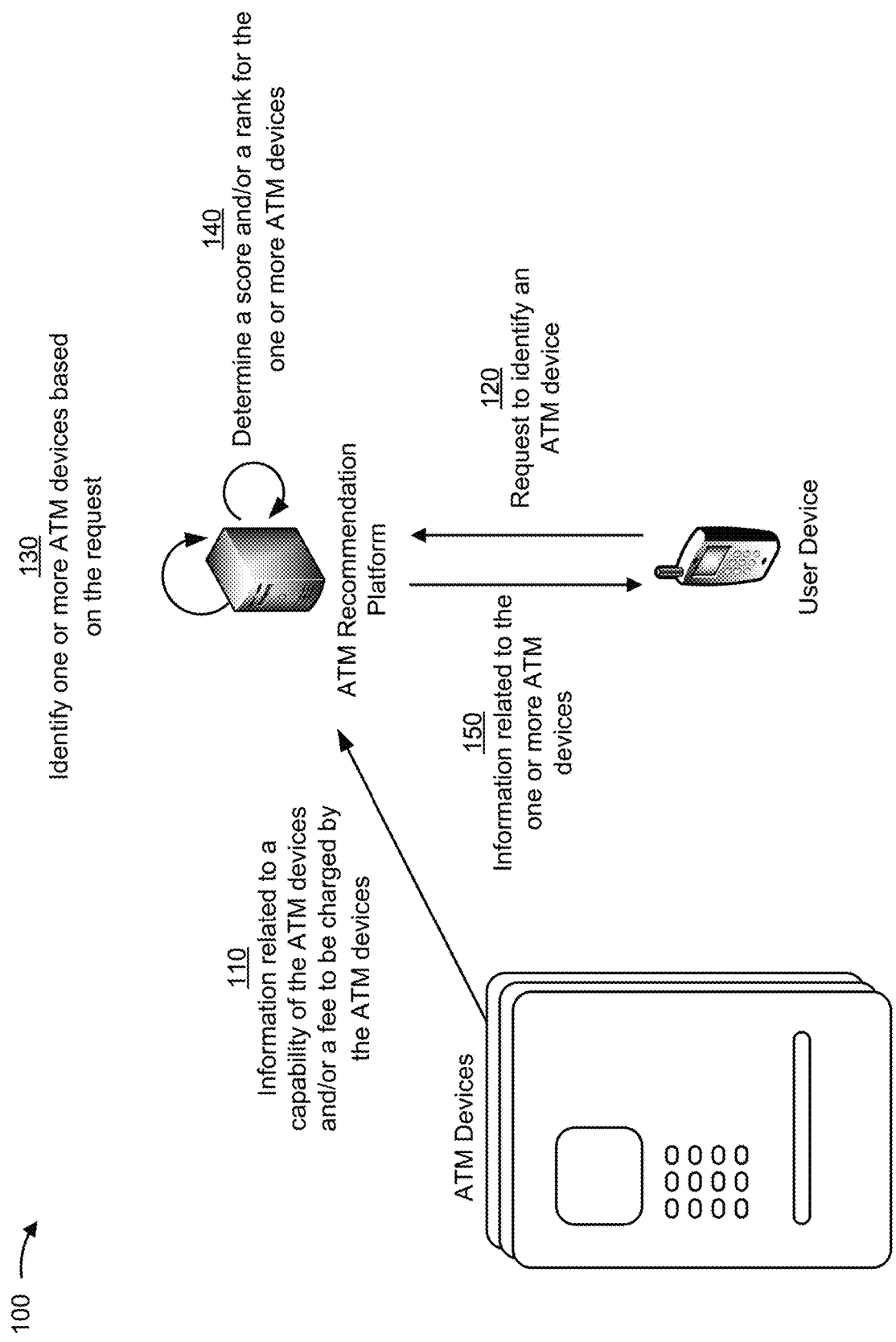
FIG. 1 is a diagram of an overview of an example implementation described herein.

FIG. 1 is a diagram of an overview of an example implementation 100 described herein. As shown in FIG. 1, implementation 100 includes multiple ATM devices, an ATM recommendation platform, and a user device.

As shown in FIG. 1, and by reference number 110, the ATM devices may provide, to the ATM recommendation platform, information, such as information related to the capabilities and/or fees of the ATM devices. For example, an ATM device may provide information regarding a capability of the ATM device and/or a fee to be charged for using the ATM device. In some implementations, dozens, hundreds, thousands, or more of ATM devices may provide thousands, millions, billions, or more of data elements, thereby providing a data set that cannot be processed manually or objectively (e.g., in a consistent manner) by a human actor.

A capability of an ATM device may relate to a service provided by the ATM device, a compatibility of the ATM device with a type of transaction card (e.g., a transaction card that includes a chip, a transaction card that includes a magnetic strip, etc.), a compatibility of the ATM device with a brand of transaction card, denominations of cash provided by the ATM device, and/or the like. Additionally, or alternatively, the information received from the ATM device may identify a location of the ATM device, a demand for the ATM, and/or the like.

The ATM recommendation platform may aggregate the information from multiple ATM devices to permit the user device to access the information. Additionally, or alternatively, the recommendation platform may aggregate the information to permit the ATM recommendation platform to select an ATM device for an individual to use, to rank multiple ATM devices, and/or the like, based on one or more factors, one or more preferences, and/or the like.

As shown by reference number 120, the user device may provide, to the ATM recommendation platform, a request to identify an ATM device. For example, a user of the user device may use an application (e.g., an application installed on the user device, executing on the user device, executed remotely by the user device, etc.) to cause the user device to provide the request to the ATM recommendation platform (e.g., by providing input via a user interface associated with the application).

The request may include information related to the user device, a user of the user device, and/or an account associated with the user device based on which the ATM recommendation platform is to identify an ATM device for an individual to use. For example, the information may identify a location of the user device, a proximity from the location of the user device within which the user wants to identify an ATM device, a service of an ATM device that the user of the user device wants to use, a priority of one or more factors related to an ATM device, one or more preferences related to the user of the user device and/or an account associated with the user device (e.g., a preference for lower fees over closer proximity), and/or the like.

As shown by reference number 130, the ATM recommendation platform may identify one or more ATM devices based on the request. For example, the ATM recommendation platform may identify one or more ATM devices where information related to the one or more ATM devices satisfies one or more factors, one or more preferences, and/or the like. For example, the ATM recommendation platform may identify one or more ATM devices where a distance between the one or more ATM devices and a location of the user device satisfies a threshold, one or more ATM devices that provide a particular service, one or more ATM devices that offer a fee that satisfies a threshold, and/or the like. The ATM recommendation platform may identify the one or more ATM devices based on the information related to the capability of the ATM device and/or a fee to be charged by the ATM device and/or information included in the request.

As shown by reference number 140, the ATM recommendation platform may determine a score and/or a rank for the one or more ATM devices. For example, the ATM recommendation platform may determine a score for an ATM device based on information associated with the ATM device satisfying one or more factors and/or one or more preferences. The score that the ATM recommendation platform determines for an ATM device may be a weighted score (e.g., where different factors and/or preferences have different weights), an average score (e.g., an average of scores for each of one or more factors and/or one or more preferences), and/or the like. The ATM recommendation platform may determine a rank for the one or more ATM devices based on a respective score determined for each of the one or more ATM devices. For example, the ATM recommendation platform may determine a rank for the one or more ATM devices from highest score to lowest score or from lowest score to highest score.

As shown by reference number 150, the ATM recommendation platform may provide, to the user device, information related to the one or more ATM devices. For example, the ATM recommendation platform may provide the information to the user device for display. The information may identify the one or more ATM devices, one or more ATM devices that have a score and/or a rank that satisfies a threshold, and/or the like. Additionally, or alternatively, the information may identify a recommended ATM device (e.g., an ATM device with the highest rank and/or score relative to other ATM devices). Additionally, or alternatively, the recommendation platform may provide, or cause user device 210 to provide, a map for display that shows a location of the one or more ATM devices and/or a recommended ATM device.

Additionally, or alternatively, the ATM recommendation platform may cause a navigational application to open on the user device. For example, the ATM recommendation platform may populate the navigational application with information identifying a location of a particular ATM device to cause the navigational application to provide turn-by-turn directions to the particular ATM device.

The ATM recommendation platform may receive information identifying a selection of an ATM device by a user of the user device. For example, the user device may receive a selection of an ATM device from the user of the user device via input from the user and may provide information identifying the selection to the ATM recommendation platform. The ATM recommendation platform may determine a set of directions to the ATM device and may provide the set of directions to the user device for display. In some cases, the user device may determine a set of directions to the ATM device based on information identifying a location of the ATM device received from the ATM recommendation platform.

In this way, an ATM recommendation platform may intelligently identify one or more ATM devices for an individual to use (e.g., based on one or more factors and/or one or more preferences related to the one or more ATM devices and/or the individual). This improves selection of an ATM device by the individual by reducing or eliminating a need for the individual to travel to multiple ATM devices to identify a suitable ATM device. Further, this conserves time of an individual and/or resources of a vehicle, such as fuel resources, that would otherwise be consumed by the individual traveling to multiple ATM devices to identify a suitable ATM device. Further, this reduces or eliminates situations where an individual pays excess fees for a service by selecting an ATM device that charges higher fees relative to another ATM device for the same service.

As indicated above, FIG. 1 is provided merely as an example. Other examples are possible and may differ from what was described with regard to FIG. 1.

Figure 2:
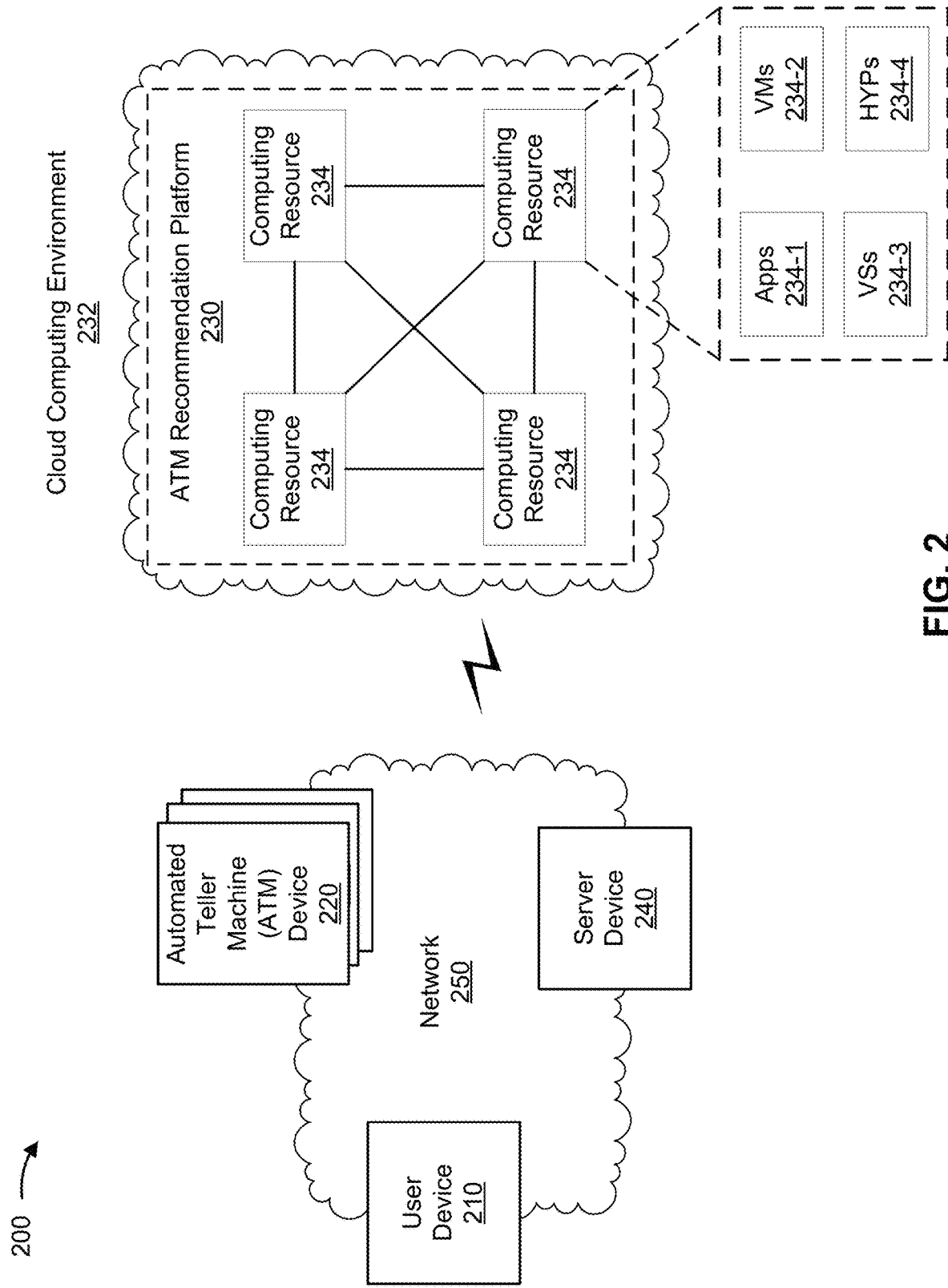
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a set of automated teller machine (ATM) devices 220 (e.g., referred to collectively as "ATM devices 220," and individually as "ATM device 220"), an ATM recommendation platform 230 provided within a cloud computing environment 232 that includes a set of computing resources 234, a server device 240, and a network 250. Devices of environment 200 may interconnect via wired connections, wireless connections, or a combination of wired and wireless connections.

User device 210 includes one or more devices capable of receiving, generating, storing, processing, and/or providing information associated with a selection of a particular ATM device 220. For example, user device 210 may include a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to ATM recommendation platform 230, a request to identify one or more ATM devices 220 based on one or more factors and/or one or more preferences, as described elsewhere herein. Additionally, or alternatively, user device 210 may receive, from ATM recommendation platform 230, information identifying one or more ATM devices 220 that satisfy one or more factors and/or one or more preferences, as described elsewhere herein. In some implementations, user device 210 may execute an application that facilitates providing the request and/or receiving the information identifying the one or more ATM devices 220.

ATM device 220 includes one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit account, etc.), and/or the like. For example, ATM device 220 may include an ATM, an automated banking machine (ABM), a cash point, a Cashline®, a Minibank®, a cash machine, a Tyme® machine, a cash dispenser, a Bankomat®, a Bancomat®, and/or a similar type of device. In some implementations, ATM device 220 may provide information to ATM recommendation platform 230 to permit ATM recommendation platform 230 to determine whether the information satisfies one or more factors and/or one or more preferences, as described elsewhere herein.

ATM recommendation platform 230 includes one or more devices capable of processing information from multiple ATM devices 220 and determining a score and/or a rank for the multiple ATM devices 220 based on the information satisfying one or more factors and/or one or more preferences. For example, ATM recommendation platform 230 may include a cloud server or a group of cloud servers. In some implementations, ATM recommendation platform 230 may be designed to be modular such that certain software components can be swapped in or out depending on a particular need. As such, ATM recommendation platform 230 may be easily and/or quickly reconfigured for different uses.

In some implementations, as shown, ATM recommendation platform 230 may be hosted in cloud computing environment 232. Notably, while implementations described herein describe ATM recommendation platform 230 as being hosted in cloud computing environment 232, in some implementations, ATM recommendation platform 230 may not be cloud-based (i.e., may be implemented outside of a cloud computing environment) or may be partially cloud-based.

Cloud computing environment 232 includes an environment that hosts ATM recommendation platform 230. Cloud computing environment 232 may provide computation, software, data access, storage, etc. services that do not require end-user knowledge of a physical location and configuration of system(s) and/or device(s) that host ATM recommendation platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host ATM recommendation platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with ATM recommendation platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Server device 240 includes one or more devices capable of receiving, providing, storing, processing, and/or generating information associated with ATM device 220 and/or a user selection of a particular ATM device 220. For example, server device 240 may include a server (e.g., in a data center or a cloud computing environment), a data center (e.g., a multi-server micro data center), a workstation computer, a virtual machine (VM) provided in a cloud computing environment, or a similar type of device. In some implementations, server device 240 may include a communication interface that allows server device 240 to receive information from and/or transmit information to other devices in environment 200. In some implementations, server device 240 may receive information from ATM recommendation platform 230 (e.g., for storage), as described elsewhere herein. Additionally, or alternatively, server device 240 may provide stored information to ATM recommendation platform 230, as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
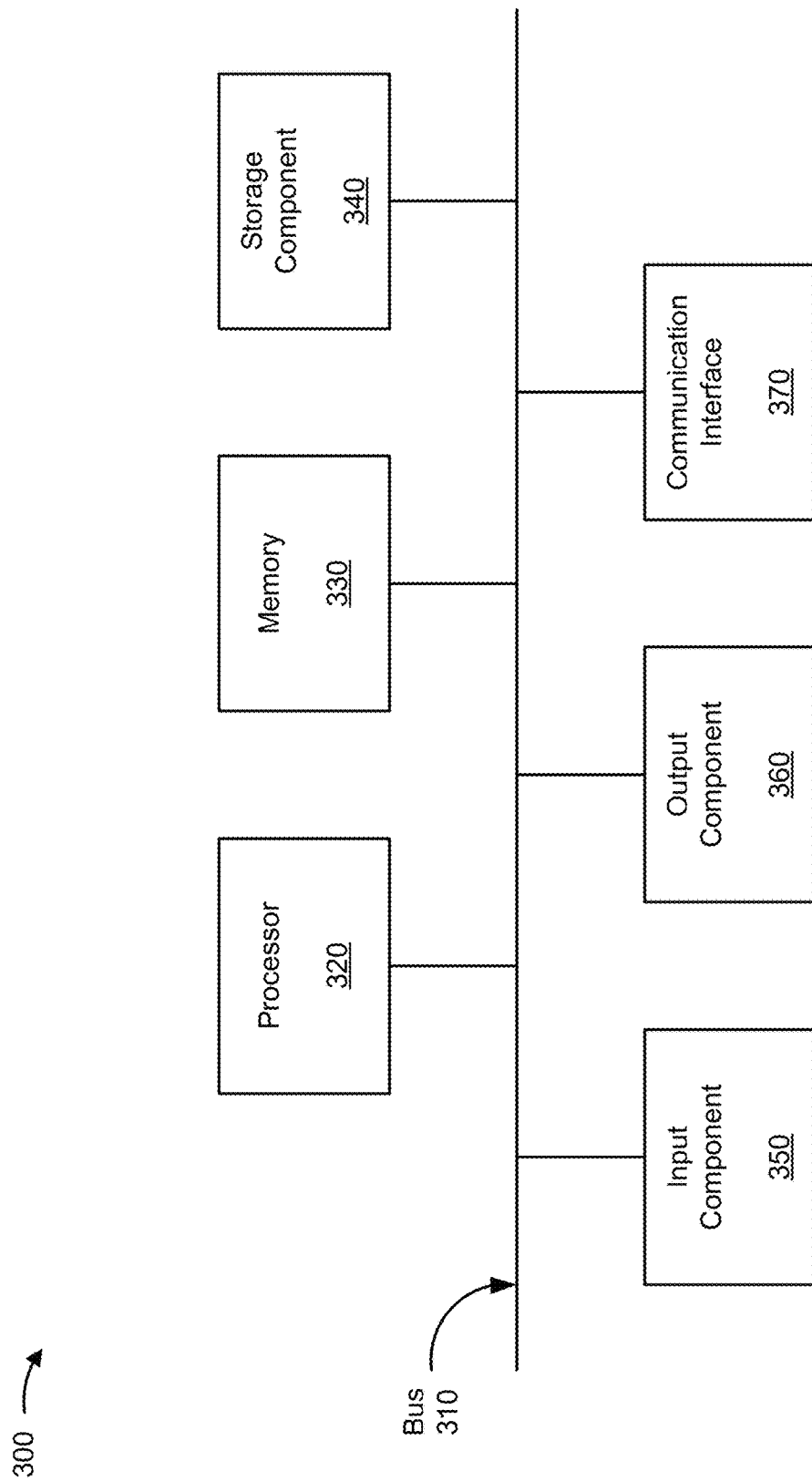
FIG. 3 is a diagram of example components of one or more devices of FIG. 2.

FIG. 3 is a diagram of example components of a device 300. Device 300 may correspond to user device 210, ATM device 220, ATM recommendation platform 230, computing resource 234, and/or server device 240. In some implementations, user device 210, ATM device 220, ATM recommendation platform 230, computing resource 234, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
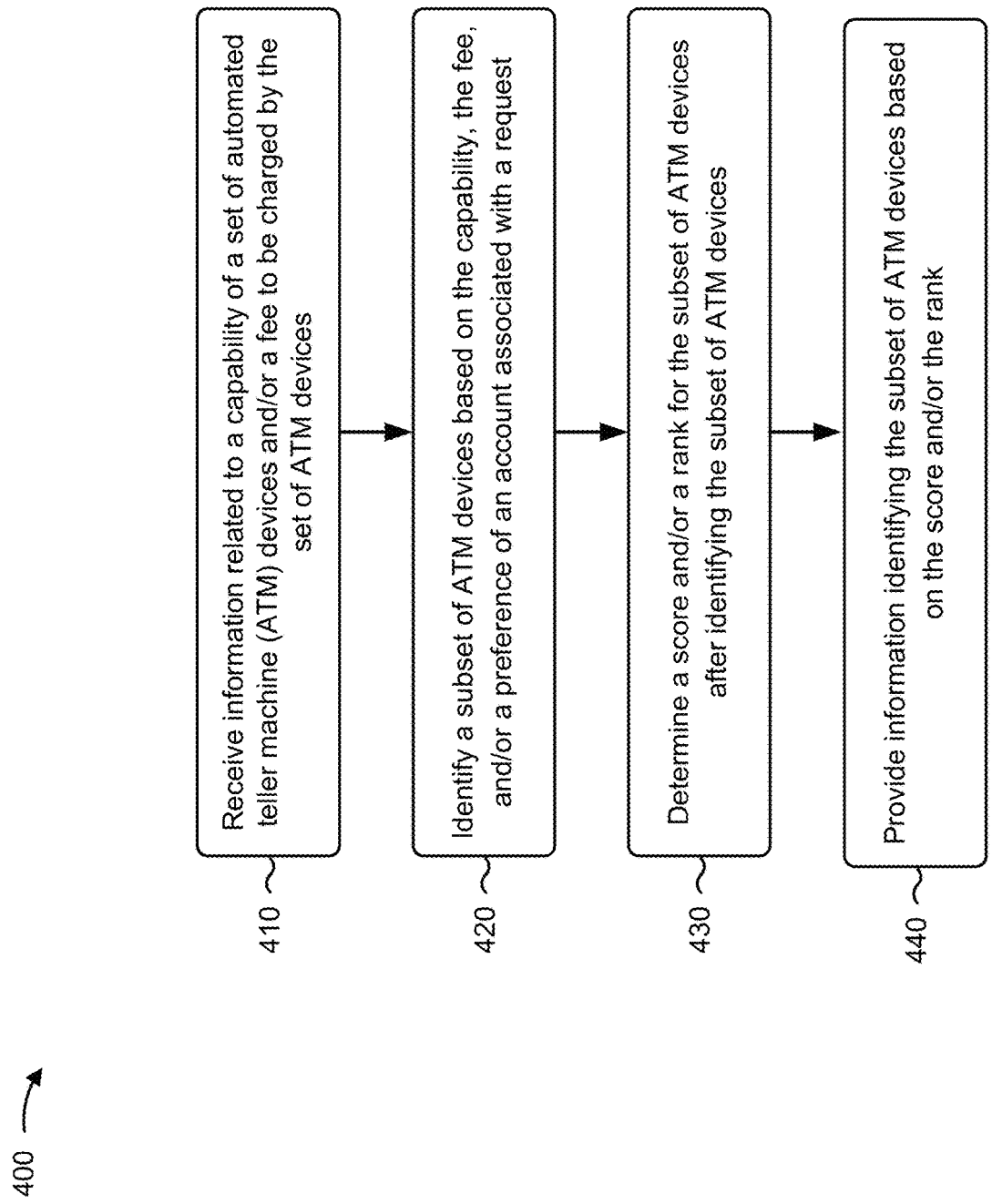
FIG. 4 is a flow chart of an example process for aggregation of automated teller machine (ATM) device-related information and/or factor-based selection of an ATM device.

FIG. 4 is a flow chart of an example process 400 for aggregation of automated teller machine (ATM) device-related information and/or factor-based selection of an ATM device. In some implementations, one or more process blocks of FIG. 4 may be performed by ATM recommendation platform 230. In some implementations, one or more process blocks of FIG. 4 may be performed by another device or a group of devices separate from or including ATM recommendation platform 230, such as user device 210, ATM device 220, or server device 240.

As shown in FIG. 4, process 400 may include receiving information related to a capability of a set of automated teller machine (ATM) devices and/or a fee to be charged by the set of ATM devices (block 410). For example, ATM recommendation platform 230 may receive, from a set of ATM devices 220, information related to a respective capability of the set of ATM devices 220 and/or a respective fee to be charged by the set of ATM devices 220. In some implementations, ATM recommendation platform 230 may receive the information periodically, according to a schedule, based on requesting the information, based on receiving a request, from user device 210, to identify an ATM device 220, and/or the like.

In some implementations, a capability of ATM device 220 may identify a capability of ATM device 220 to provide cash (e.g., an amount of cash, denominations of cash, etc. in association with a cash withdrawal). Additionally, or alternatively, a capability may relate to a capability of ATM device 220 to provide a service. For example, the information may identify a capability of ATM device 220 to provide a service related to transferring money between financial accounts, depositing money into a financial account, withdrawing money from a financial account, contacting a representative associated with a financial institution, exchanging money in one currency for money in another currency, and/or the like. Additionally, or alternatively, a capability of ATM device 220 may relate to whether ATM device 220 can receive biometric information (e.g., a finger print scan, a facial scan, a retina scan, voice input, etc.) as input, such as to authenticate a user of ATM device 220.

In some implementations, the information may identify a fee to be charged by ATM device 220. For example, the information may identify fees to be charged for various services provided by ATM device 220 (e.g., a service related to withdrawing cash, depositing cash, transferring money, etc.), a schedule of fees charged by ATM device 220 (e.g., based on a day of the week or a time of day), and/or the like. In some implementations, a fee charged by an ATM device 220 may be dynamic and, thus, may change according to a schedule, based on demand, based on an occurrence of an event, and/or the like.

Additionally, or alternatively, a fee may depend on a relationship between financial institutions, processing networks for transactions, a type of an account (e.g., a checking account, a savings account, a business account, a personal account, etc.), and/or the like. For example, a fee may increase or decrease depending on whether the fee is reimbursable by a financial institution, whether two or more financial institutions have reciprocal fee agreements, whether a particular financial institution is associated with a network of financial institutions, whether an individual and/or an account is associated with a threshold quantity of transactions via out-of-network ATM devices 220, and/or the like. In some implementations, a set of rules may indicate a fee that is to be offered for a service and/or whether the fee is to increase or decrease, and ATM recommendation platform 230 may use the set of rules to determine a fee for an individual, for a service, and/or the like.

In some implementations, ATM recommendation platform 230 may use information related to an individual and/or an account associated with the individual to determine a fee to be charged to the individual for a service. For example, the information may relate to a quantity and/or frequency of transactions associated with the individual and/or the account, whether the individual and/or the account has a higher priority relative to other individuals and/or accounts, types of services used by the individual and/or the account in the past, and/or the like to improve a fee ranking, determination of a fee to be offered for a service, and/or identification of a fee that may satisfy a set of preferences associated with the individual and/or the account.

As a specific example, ATM recommendation platform 230 may identify an account that is associated with a quantity of transactions that satisfies a threshold as having a higher priority relative to another account that is not associated with a quantity of transactions that satisfies the threshold and ATM recommendation platform 230 may determine a lower fee for the account relative to the other account. In some implementations, this may permit ATM recommendation platform 230 to provide, to user device 210, information related to the availability a fee and/or an availability of a particular ATM device 220 in real-time or near real-time.

In some implementations, the information may relate to other factors associated with ATM device 220. For example, the information may identify a location of ATM device 220, a demand for ATM device 220 (e.g., a quantity of requests, during a time period, for services from ATM device 220 by users of ATM device 220), a compatibility of ATM device 220 with a type of transaction card (e.g., a transaction card that includes a chip, a transaction card capable of RF communications, etc.), a compatibility of ATM device 220 with a particular brand of transaction card, a compatibility of ATM device 220 with accounts associated with a particular financial institution, and/or the like.

In some implementations, ATM recommendation platform 230 may determine a likelihood that an individual may have to wait to use a particular ATM device 220. For example, ATM recommendation platform 230 may use historical data and/or real-time (or near real-time) data of a particular ATM device 220 to determine whether the particular ATM device 220 is in use, has historically experienced a threshold amount of use at a time of day or on a day of the week (e.g., the same time of day or day of the week that an individual wants to use the particular ATM device 220), and/or the like. In some implementations, ATM recommendation platform 230 may provide, for display via user device 210, information that identifies a likelihood, or an amount of time, that an individual may have to wait to use a particular ATM device 220.

In some implementations, ATM recommendation platform 230 may receive information related to a set of ATM devices 220 based on communicating with the set of ATM devices 220, by accessing data stored by server device 240, and/or the like. In this way, ATM recommendation platform 230 may receive information related to ATM devices 220 directly from ATM devices 220 (e.g., rather than, or in association with, receiving the information via crowdsourcing or another technique that is based on receiving input from users of user devices 210 and/or ATM recommendation platform 230). Additionally, or alternatively, because ATM recommendation platform 230 is receiving information from ATM devices 220 and not via input by a user of user device 210 and/or ATM recommendation platform 230, additional techniques may be needed to receive the information from networks of ATM devices 220, such as information that would not be available to a user of ATM device 220 (e.g., information identifying an amount of cash in a cash supply of ATM device 220).

For example, ATM recommendation platform 230 may need to use different communications protocols and/or messages to communicate with ATM devices 220 associated with different financial institutions, may need to format data from different ATM devices 220 into a uniform format, may need to normalize data from different ATM devices 220 (e.g., normalize to a uniform scale), may need to aggregate data from ATM devices 220 associated with different financial institutions, may need to receive encrypted data from ATM devices 220 (e.g., because ATM recommendation platform 230 is receiving data not available to a user of ATM device 220), and/or the like.

In this way, ATM recommendation platform 230 may receive information related to a capability of a set of ATM devices 220 and/or a fee to be charged by the set of ATM devices 220.

As further shown in FIG. 4, process 400 may include identifying a subset of ATM devices based on the capability, the fee, and/or a preference of an account associated with a request (block 420). For example, ATM recommendation platform 230 may identify a subset of ATM devices based on the capability, the fee, and/or a preference of an account associated with a request.

In some implementations, ATM recommendation platform 230 may receive, from user device 210, a request to identify ATM device 220 of a set of ATM devices 220. For example, the request may relate to identifying a particular ATM device 220 from which an individual associated with user device 210 can receive cash, can access a service, and/or the like. In some implementations, ATM recommendation platform 230 may receive the request based on a user of user device 210 providing input to user device 210 (e.g., by selecting a control on a user interface associated with user device 210, by inputting text via a user interface of user device 210, etc.). In some implementations, user device 210 may receive input from a user of user device 210 via an application accessed via user device 210. For example, the application may provide a user interface associated with ATM recommendation platform 230.

In some implementations, ATM recommendation platform 230 may receive the request in association with a request for a cash delivery. For example, ATM recommendation platform 230 may receive the request when a user of user device 210 requests, via user device 210, a cash delivery from an organization and/or an individual.

In some implementations, ATM recommendation platform 230 may receive a request after providing a notification to user device 210 for display. For example, ATM recommendation platform 230 may provide a notification to user device 210 that identifies a capability of ATM device 220 and/or a fee charged by ATM device 220 (e.g., after determining that a fee to be charged by ATM device 220 satisfies a threshold, that ATM device 220 can provide a particular service, that user device 210 is at a particular location, etc.).

In some implementations, ATM recommendation platform 230 may provide a notification to user device 210 based on a proximity of user device 210 and ATM device 220 and may receive a request from user device 210 after providing the notification to user device 210. For example, ATM recommendation platform 230 may detect that a proximity of user device 210 and ATM device 220 satisfies a threshold (e.g., based on information from ATM device 220 identifying a location of ATM device 220 and information from user device 210 identifying a location of user device 210). Continuing with the previous example, ATM recommendation platform 230 may provide a notification to user device 210 after detecting that the proximity of user device 210 and ATM device 220 satisfies a threshold (e.g., ATM recommendation platform 230 may push a notification to user device 210 without user device 210 providing a request to identify ATM device 220). In some implementations, and continuing with the previous example, the notification may identify that the proximity of user device 210 and ATM device 220 satisfies a threshold.

In some implementations, a request from user device 210 may include information related to a user of user device 210, an account associated with user device 210, and/or the like. For example, the information may identify a user of user device 210, an account associated with user device 210, a preference of a user and/or an account associated with user device 210 (e.g., a preference related to a proximity of user device 210 and ATM device 220, a threshold fee to be charged by ATM device 220, denominations for cash to be received from ATM device 220, etc.), a service to be accessed by a user of user device 210, a type and/or brand of transaction card associated with an account associated with user device 210 or to be used by a user of ATM device 220, a location of user device 210, and/or the like. Although the information from user device 210 may identify a preference, ATM recommendation platform 230 may have previously stored information related to a preference of a user of user device 210 and/or an account associated with user device 210. For example, ATM recommendation platform 230 may have identified a preference from a previous request, when a user of user device 210 set up an account at a previous time, and/or the like.

In some implementations, ATM recommendation platform 230 may identify a subset of ATM devices 220. For example, ATM recommendation platform 230 may have received information from a set of ATM devices 220 and ATM recommendation platform 230 may identify a subset of ATM devices 220 (i.e., fewer than all ATM devices 220 in the set of ATM devices 220) based on a request from user device 210 (e.g., a subset of ATM devices 220 where information from the subset of ATM devices 220 satisfies a threshold, satisfies one or more factors, satisfies one or more preferences, etc.).

In some implementations, and as a specific example, ATM recommendation platform 230 may identify a subset of ATM devices 220 based on one or more factors (e.g., based on the one or more factors being satisfied). For example, the one or more factors may relate to ATM device 220 (e.g., a location of ATM device 220, a service provided by ATM device 220, a fee to be charged by ATM device 220, a capability of ATM device 220, etc.), user device 210 (e.g., a location of user device 210, a proximity of user device 210 and ATM device 220, a preference related to an account and/or a user associated with user device 210, etc.), an account associated with an individual (e.g., a type of account, such as a savings account or a checking account, a transaction card associated with an account, etc.), and/or the like.

In some implementations, ATM recommendation platform 230 may identify a subset of ATM devices 220 based on particular factors being satisfied, values for the factors satisfying a threshold, preferences associated with an account being satisfied, and/or the like (e.g., in real-time or near real-time as different combinations of factors are satisfied over time, as the values for the factors change over time, as different combinations of preferences are satisfied, as preferences associated with an account change, etc.).

As a specific example, an account may be associated with a preference for a lower fee relative to a closer proximity. In this case, ATM recommendation platform 230 may include ATM devices 220 in a subset of ATM devices 220 based on the fees charged by ATM devices 220 being less than a threshold (e.g., rather than including ATM devices 220 that are within a threshold distance of user device 210 associated with an individual associated with the account). Conversely, if an individual associated with an account changes a preference of the account to preferring ATM devices 220 that are proximate to the location of the individual rather than preferring a lower fee, ATM recommendation platform 230 may select a subset of ATM devices 220 that are within a threshold distance of user device 210 associated with the individual (e.g., rather than selecting a subset of ATM devices 220 based on a fee satisfying a threshold).

As another example, ATM recommendation platform 230 may prioritize ATM devices 220 for inclusion in a subset of ATM devices 220 based on whether a fee charged by the ATM devices 220 for a service is reimbursable by a financial institution associated with an individual wanting to use one of the ATM devices 220. Continuing with the previous example, ATM recommendation platform 230 may prioritize ATM devices 220 with reimbursable fees relative to ATM devices 220 that have a closer proximity to user device 210 associated with the individual relative to other ATM devices 220, that offer lower fees relative to other ATM devices 220, and/or the like.

Continuing with the previous example, if ATM recommendation platform 230 determines that the individual has completed a threshold quantity of transactions with reimbursable fees, ATM recommendation platform 230 may prioritize ATM devices 220 for inclusion in a subset of ATM devices 220 based on another factor (e.g., lower relative fees, closer proximity to user device 210 associated with the individual, etc.). In some implementations, other factors related to ATM devices 220 and/or preferences of an account associated with an individual may cause ATM recommendation platform 230 to include different ATM devices 220 in a subset of ATM devices 220. Additionally, or alternatively, ATM recommendation platform 230 may perform a lookup of a set of rules (e.g., in real-time or near real-time) that is to be used to determine ATM devices 220 to include in a subset of ATM devices 220. In this way, ATM recommendation platform 230 may intelligently, and in real-time or near real-time, determine ATM devices 220 to include in a subset of ATM devices 220.

In some implementations, ATM recommendation platform 230 may facilitate competitive bidding among providers of ATM devices 220 in association with receiving a request to identify a particular ATM device 220 for an individual to use. For example, when ATM recommendation platform 230 identifies a subset of ATM devices 220, ATM recommendation platform 230 may request bids for fees for services the individual wants to access. In some implementations, ATM recommendation platform 230 may provide, to each of the providers of ATM devices 220, information that identifies bids from the other providers, to permit the providers to provide updated bids based on the bids of the other providers. In some implementations, the information may identify a high bid, may identify a low bid, may be anonymized, and/or the like. This facilitates competitive bidding among providers of ATM devices 220, thereby resulting in reduced fees for users of ATM devices 220.

In some implementations, ATM recommendation platform 230 may receive a stream (e.g., in real-time or near real-time) of information that identifies fees for services provided by ATM devices 220. In some implementations, ATM recommendation platform 230 may publish the information to each provider (e.g., each provider that provides at least one ATM device 220 in a geographic area, within a threshold proximity to user device 210, etc.), thereby permitting providers of ATM devices 220 to adjust fees based on the fees charged by other providers of ATM devices 220. This results in reduced fees charged for services provided by ATM devices 220.

In this way, ATM recommendation platform 230 may identify a subset of ATM devices 220 based on the capability, the fee, and/or a preference of an account associated with a request.

As further shown in FIG. 4, process 400 may include determining a score and/or a rank for the subset of ATM devices after identifying the subset of ATM devices (block 430). For example, ATM recommendation platform 230 may determine a score and/or a rank for each ATM device 220 in the subset of ATM devices 220. In some implementations, ATM recommendation platform 230 may determine a score for a particular ATM device 220 based on a capability of the particular ATM device 220, a fee to be charged by the particular ATM device 220, information identifying a preference of an individual and/or an account associated with user device 210, information associated with ATM device 220 satisfying one or more factors, and/or the like.

In some implementations, a score may indicate a match between information related to ATM device 220 and a preference of an account, an individual, and/or the like associated with user device 210. Additionally, or alternatively, a score may indicate a degree to which information associated with ATM device 220 satisfies one or more factors. Additionally, or alternatively, a score may indicate whether, or a degree to which, information related to ATM device 220 satisfies a threshold. In some implementations, a score may be a weighted score (e.g., where different factors associated with ATM device 220 and/or different preferences associated with an individual or an account are weighted more than others), an average score (e.g., an average of scores for different factors and/or preferences), a result of applying a function to scores associated with factors and/or preferences, and/or the like.

In some implementations, a score may indicate a confidence that ATM device 220 is a best fit for a user of user device 210 and/or an account associated with user device 210. For example, ATM recommendation platform 230 may use machine learning, artificial intelligence, and/or the like to generate a model related to a user of user device 210 and/or an account associated with user device 210 (e.g., where the model is trained on information identifying prior selected ATM devices 220, information related to the prior selected ATM devices 220, information identifying a preference of the user of user device 210 and/or an account associated with user device 210, etc.). Continuing with the previous example, ATM recommendation platform 230 may use the model to determine whether a particular ATM device 220 is a best fit for a user of user device 210 and/or an account associated with user device 210 (e.g., the model may output a score that identifies a confidence that ATM device 220 is a best fit for a user and/or an account associated with user device 210).

In some implementations, ATM recommendation platform 230 may determine a score for ATM device 220 after identifying ATM device 220. For example, ATM recommendation platform 230 may determine a score for a subset of ATM devices 220 after identifying the subset of ATM devices 220. Continuing with the previous example, ATM recommendation platform 230 may receive information from a set of ATM devices 220, may identify a subset of ATM devices 220, and may determine a score for the subset of ATM devices 220 after identifying the subset of ATM devices 220. This conserves processing resources of ATM recommendation platform 230 that would otherwise be consumed determining a score for a set of ATM devices 220 relative to a subset of ATM devices 220.

In some implementations, ATM recommendation platform 230 may determine a rank for each of a subset of ATM devices 220. For example, ATM recommendation platform 230 may determine a rank for each of a subset of ATM devices 220 based on a score associated with each of the subset of ATM devices 220. Continuing with the previous example, ATM recommendation platform 230 may determine a rank for a subset of ATM devices 220 from highest score to lowest score or lowest score to highest score.

In some implementations, ATM recommendation platform 230 may identify one or more of the subset of ATM devices 220. For example, ATM recommendation platform 230 may identify one or more of the subset of ATM devices 220 based on a score, a rank, and/or the like (e.g., after determining that a score and/or a rank satisfies a threshold). In some implementations, ATM recommendation platform 230 may identify one or more of the subset of ATM devices 220 that have a threshold score, the highest score relative to other ATM devices 220, a threshold rank, the highest rank relative to other ATM devices 220, and/or the like.

In this way, ATM recommendation platform 230 may determine a score and/or a rank for the subset of ATM devices 220 after identifying the subset of ATM devices 220.

As further shown in FIG. 4, process 400 may include providing information identifying the subset of ATM devices based on the score and/or the rank (block 440). For example, ATM recommendation platform 230 may provide information identifying the subset of ATM devices 220 based on the scores and/or the ranks associated with the subset of ATM devices 220. In some implementations, ATM recommendation platform 230 may provide the information for display (e.g., via a display of user device 210).

In some implementations, ATM recommendation platform 230 may provide information identifying the subset of ATM devices 220 after determining that the subset of ATM devices 220 are associated with scores and/or ranks that satisfy a threshold. For example, ATM recommendation platform 230 may determine that a respective score and/or a respective rank for each of a subset of ATM devices 220 satisfies a threshold and may provide information identifying each of the subset of ATM devices 220 after determining that the respective score and/or the respective rank for each of the subset of ATM devices 220 satisfies the threshold.

In some implementations, ATM recommendation platform 230 may provide information identifying the subset of ATM devices 220 in association with a cash delivery. For example, the information may be provided to user device 210 associated with an individual who is to provide a cash delivery to another individual that requested a cash delivery (e.g., to permit the individual delivering the cash to identify a particular ATM device 220 from which to receive cash for the cash delivery).

In some implementations, ATM recommendation platform 230 may provide other information to user device 210. For example, ATM recommendation platform 230 may provide information identifying a respective location of each of a subset of ATM devices 220, respective services provided by each of a subset of ATM devices 220, a respective schedule of fees for services provided by each of a subset of ATM devices 220, a respective score and/or a respective rank for each of a subset of ATM devices 220, and/or the like.

In some implementations, ATM recommendation platform 230 may receive, from user device 210, a selection of a particular ATM device 220, of the subset of ATM devices 220, as a selected ATM device 220. For example, ATM recommendation platform 230 may receive a selection from user device 210 after providing information identifying the subset of ATM devices 220 to user device 210 for display. Continuing with the previous example, a display associated with user device 210 may display the information identifying the subset of ATM devices 220 and user device 210 may receive a selection of a particular ATM device 220 via input from a user of user device 210 (e.g., selection of a control on a user interface displayed by a display associated with user device 210).

In some implementations, ATM recommendation platform 230 may determine a set of directions to a particular ATM device 220. For example, ATM recommendation platform 230 may determine a set of directions to a selected ATM device 220. In some implementations, ATM recommendation platform 230 may provide, to user device 210, a set of directions to the selected ATM device 220.

Additionally, or alternatively, ATM recommendation platform 230 may provide information identifying a location of a selected ATM device 220 and/or a set of instructions to user device 210. For example, ATM recommendation platform 230 may provide information identifying a location of ATM device 220 to user device 210 to permit user device 210 to determine a set of directions to the selected ATM device 220. Additionally, or alternatively, and as another example, ATM recommendation platform 230 may provide a set of instructions to user device 210 to cause user device 210 to determine a set of directions to a selected ATM device 220. Additionally, or alternatively, ATM recommendation platform 230 may cause a navigational application to open on user device 210 and to provide directions (e.g., turn-by-turn directions) to a location of ATM device 220. This conserves processing resources of user device 210 that would otherwise be consumed by a user of user device 210 manually opening the navigational application, inputting information that identifies a location of ATM device 220, and causing the navigational application to provide directions to the location of ATM device 220.

In some implementations, ATM recommendation platform 230 may generate a report. For example, ATM recommendation platform 230 may generate a report related to a fee to be charged by a subset of ATM devices 220 (e.g., a report that identifies a fee to be charged). Additionally, or alternatively, ATM recommendation platform 230 may generate a report related to a selection of a particular ATM device 220 (e.g., information that identifies a selected ATM device 220). In some implementations, ATM recommendation platform 230 may provide a generated report. For example, ATM recommendation platform 230 may provide a generated report to a financial organization associated with ATM device 220 (e.g., user device 210 and/or server device 240 associated with the financial organization), ATM device 220, server device 240 associated with ATM device 220, and/or the like.

In some implementations, a report may include information identifying fees charged by ATM devices 220 associated with different organizations. For example, the report may be an anonymized report, a partially anonymized report, or a non-anonymized report that identifies fees charged by ATM devices 220 associated with different organizations. In this way, ATM recommendation platform 230 may notify organizations that provide ATM devices 220 fees that are being charged by other organizations. This may reduce fees for users of ATM devices 220 by facilitating competition among organizations that provide ATM devices 220.

In this way, ATM recommendation platform 230 may provide information identifying the subset of ATM devices 220 based on the scores and/or ranks for the subset of ATM devices 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In some implementations, ATM recommendation platform 230 may receive and/or provide, for display, reviews of ATM devices 220 (e.g., via user device 210). For example, a review may include information that identifies and/or describes a location of ATM device 220, a user experience with ATM device 220, a rating for ATM device 220, and/or the like. This permits ATM recommendation platform 230 to provide, for display, information that aides a user of ATM recommendation platform 230 when selecting a particular ATM device 220 to use. In addition, this permits ATM recommendation platform 230 to dynamically adjust a score and/or a rank for a particular ATM device 220 based on reviews from users of ATM device 220, to determine whether to include a particular ATM device 220 in a subset of ATM devices 220 offered to a user of ATM recommendation platform 230, and/or the like, thereby improving the subset of ATM devices 220 offered to a user of ATM recommendation platform 230.

Figure 5:
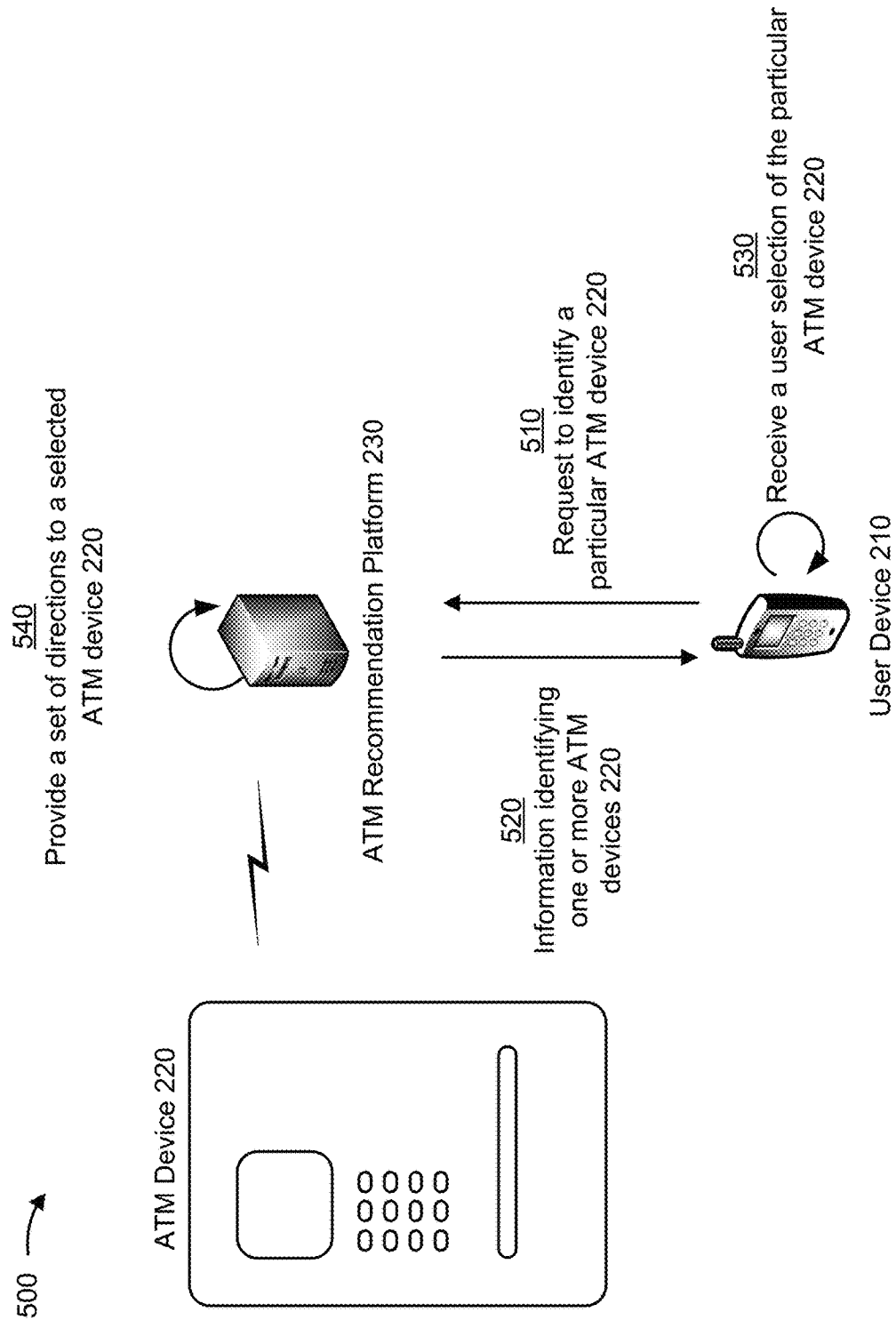
FIG. 5 is a diagram of an example implementation relating to the example process shown in FIG. 4.

FIG. 5 is a diagram of an example implementation 500 related to process 400 shown in FIG. 4. FIG. 5 shows an example implementation from the perspective of user device 210.

As shown in FIG. 5, and by reference number 510, user device 210 may provide, to ATM recommendation platform 230, a request to identify a particular ATM device 220. For example, user device 210 may provide the request based on input from a user of user device 210. As shown by reference number 520, user device 210 may receive, from ATM recommendation platform 230, information identifying one or more ATM devices 220. For example, ATM recommendation platform 230 may have identified the one or more ATM devices 220 based on information associated with the one or more ATM devices 220 satisfying a threshold, satisfying one or more factors, satisfying one or more preferences of a user of user device 210 and/or an account associated with user device 210, and/or the like.

As shown by reference number 530, user device 210 may receive a user selection of the particular ATM device 220. For example, the user selection may be received via a user interface displayed by a display associated with user device 210. In some implementations, the particular ATM device 220 may be selected from the one or more ATM devices 220 for which information was received from ATM recommendation platform 230. In some implementations, user device 210 may provide, to ATM recommendation platform 230, information identifying the user selection. As shown by reference number 540, ATM recommendation platform 230 may provide a set of directions to a selected ATM device 220. For example, ATM recommendation platform 230 may provide a set of directions to the selected ATM device 220 to user device 210 (e.g., for display).

As indicated above, FIG. 5 is provided merely as an example. Other examples are possible and may differ from what was described with regard to FIG. 5.

In this way, ATM recommendation platform 230 may identify a set of ATM devices 220 for an individual to use. For example, ATM recommendation platform 230 may intelligently identify the set of ATM devices 220 based on information associated with the set of ATM devices 220 satisfying a threshold, satisfying one or more factors, satisfying one or more preferences, and/or the like. This improves a capability of an individual to select a particular ATM device 220, from multiple ATM devices 220, based on one or more factors, one or more preferences, and/or the like by reducing or eliminating a need for the individual to select a particular ATM device 220 without information related to fees to be charged by the multiple ATM devices 220, services provided by the multiple ATM devices 220, and/or the like. Further, this conserves computing resources of a device that would be consumed by an individual using the device to research ATM devices 220 to identify a particular ATM device 220 to use. Further, this permits an individual to make an informed decision with regard to selecting a particular ATM device 220 to use, thereby improving selection of the particular ATM device 220. Further, this saves an individual money, by reducing or eliminating payment of a fee for a service provided by ATM device 220 that is higher relative to another fee for the same service provided by a different ATM device 220. Further, this facilitates competition among providers of ATM devices 220, thereby resulting in reduced fees for users of ATM devices 220.

Further, in this way, ATM recommendation platform 230 provides a marketplace for ATM devices 220 (e.g., for fees and/or services related to ATM devices 220) with transparent pricing. This permits an organization associated with ATM recommendation platform 230 to negotiate fee rates and/or memberships with other organizations based on volume discounts. In addition, this permits the organization to request a fee from a provider of ATM device 220 for ATM device 220 to be offered as a potential ATM device 220 via ATM recommendation platform 230 and/or to request that the provider of ATM device 220 limit a fee charged to customers of the organization associated with ATM recommendation platform 230.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, configured to:
        receive, from a plurality of automated teller machine (ATM) devices, information related to:
            a quantity of requests for services, during a time period, for each of the plurality of ATM devices;
            a compatibility of each of the plurality of ATM devices with a type of transaction card; and
            a fee to be charged by each of the plurality of ATM devices in association with providing cash;
        receive, from a first user device, a request to identify an ATM device, of the plurality of ATM devices, from which an individual can receive the cash,
            the request being received in association with another request, associated with the first user device, for a cash delivery to a location of the first user device, and
            the other request for the cash delivery requesting a second user, different than a first user associated with the first user device, deliver cash from the ATM device and to the location of the first user device;
        determine, after receiving the request, scores for the plurality of ATM devices, a score for one of the plurality of ATM devices being based on:
            the quantity of requests for services, during the time period, for the one of the plurality of ATM devices;
            the compatibility of the one of the plurality of ATM devices with the type of transaction card; and
            the fee to be charged by the one of the plurality of ATM devices;
        determine a rank for the plurality of ATM devices based on the scores for the plurality of ATM devices;
        provide, to a second user device associated with the second user who is to deliver the cash and based on the rank, information identifying the ATM device and/or one or more other ATM devices of the plurality of ATM devices;
        cause a navigational application to automatically open on the second user device; and
        populate the navigational application with information identifying a location of the ATM device and/or the one or more other ATM devices of the plurality of ATM devices to cause the navigational application to provide directions to the ATM device and/or the one or more other ATM devices of the plurality of ATM devices.

2. The device of claim 1, where the one or more processors are further configured to:
    provide, to the first user device, a notification that identifies:

the fee; and
where the one or more processors, when receiving the request, are configured to:
receive the request after providing the notification to the first user device.

3. The device of claim 1, where the one or more processors are further configured to:
receive, from the second user device, a selection of the ATM device or another ATM device of the one or more other ATM devices, as a selected ATM device, after providing the information identifying the ATM device and/or the one or more other ATM devices; and
where the one or more processors, when populating the navigational application, are to:
populate the navigational application with information identifying the selected ATM device after receiving the selection from the second user device.

4. The device of claim 1, where the one or more processors are further configured to:
identify the plurality of ATM devices based on one or more factors; and
where the one or more processors, when determining the scores, are configured to:
determine the scores for the plurality of ATM devices after identifying the plurality of ATM devices.

5. The device of claim 1, where the one or more processors are further configured to:
detect that proximity of the first user device and each of the plurality of ATM devices satisfies a threshold;
provide a notification to the first user device based on the proximity satisfying the threshold,
the notification identifying that the proximity of the first user device and each of the plurality of ATM devices satisfies the threshold; and
where the one or more processors, when receiving the request, are configured to:
receive the request after providing the notification.

6. The device of claim 1, where each of the scores indicates a likelihood of a match between a respective one of the plurality of ATM devices and a preference of the first user.

7. The device of claim 1, where the one or more processors, when determining the score for the one of the plurality of ATM devices, are to:
determine an average score for the one of the plurality of ATM devices.

8. The device of claim 1, where the one or more processors, when determining the score for the one of the plurality of ATM devices, are to:
determine a weighted score for the one of the plurality of ATM devices.

9. A non-transitory computer-readable medium storing instructions, the instructions comprising:
one or more instructions that, when executed by one or more processors, cause the one or more processors to:
receive, from a plurality of automated teller machine (ATM) devices, information related to:
a quantity of requests for services, during a time period, for each of the plurality of ATM devices,
a compatibility of each of the plurality of ATM devices with a type of transaction card, and
a fee to be charged by each of the plurality of ATM devices in association with providing cash;
receive, from a first user device, a request to identify an ATM device of the plurality of ATM devices,
the request being received in association with another request, associated with the first user device, for a cash delivery to a location of the first user device, and
the other request for the cash delivery requesting a second user, different than a first user associated with the first user device, deliver cash from the ATM device to the location of the first user device;
determine, after receiving the request, scores for the plurality of ATM devices, a score for one of the plurality of ATM devices being based on:
the quantity of requests for services, during the time period, for the one of the plurality of ATM devices,
the compatibility of the one of the plurality of ATM devices with the type of transaction card, and
the fee to be charged by the one of the plurality of ATM devices;
determine a rank for the plurality of ATM devices based on the scores for the plurality of ATM devices;
provide, to a second user device associated with the second user who is to deliver the cash and based on the rank, information identifying the ATM device and/or one or more other ATM devices of the plurality of ATM devices;
cause a navigational application to automatically open on the second user device; and
populate the navigational application with information identifying a location of the ATM device and/or the one or more other ATM devices of the plurality of ATM devices to cause the navigational application to provide directions to the ATM device and/or the one or more other ATM devices of the plurality of ATM devices.

10. The non-transitory computer-readable medium of claim 9, where the one or more instructions, that cause the one or more processors to provide the information identifying the ATM device and/or the one or more other ATM devices, cause the one or more processors to:
provide the information identifying the ATM device and/or the one or more other ATM devices in association with the cash delivery.

11. The non-transitory computer-readable medium of claim 9, where the one or more instructions, when executed by the one or more processors, further cause the one or more processors to:
receive, from the second user device associated with the second user who is to deliver the cash, a selection of a particular ATM device from among the ATM device and/or one or more other ATM devices;
generate a report related to the selection of the particular ATM device by the second user device associated with the second user who is to deliver the cash; and
provide the report to:
a financial organization associated with one or more of the plurality of ATM devices,
one or more of the plurality of ATM devices, or
a server device associated with one or more of the plurality of ATM devices.

12. The non-transitory computer-readable medium of claim 9, where the one or more instructions, when executed by the one or more processors, further cause the one or more processors to:
determine whether the score for the ATM device satisfies a threshold after determining the score; and
identify the ATM device or the one or more other ATM devices based on the score satisfying the threshold.

13. The non-transitory computer-readable medium of claim 9, where the one or more instructions, when executed by the one or more processors, further cause the one or more processors to:
  receive a selection of the ATM device or the one or more other ATM devices after providing the information identifying the ATM device and/or the one or more other ATM devices.

14. A method, comprising:
  receiving, by a device and from a plurality of automated teller machine (ATM) devices, information related to:
    a quantity of requests for services, during a time period, for each of the plurality of ATM devices, and
    a compatibility of each of the plurality of ATM devices with a type of transaction card;
  receiving, by the device and from a first user device, a request to identify an ATM device, of the plurality of ATM devices, that can provide cash to an individual,
    the request being received in association with another request, associated with the first user device, for a cash delivery to a location of the first user device, and
    the other request for the cash delivery requesting a second user, different than a first user associated with the first user device, deliver cash from the ATM device and to the location of the first user device;
  determining, by the device and after receiving the request, scores for the plurality of ATM devices, a score for one of the plurality of ATM devices being based on:
    the quantity of requests for services, during the time period, for the one of the plurality of ATM devices,
    the compatibility of the one of the plurality of ATM devices with the type of transaction card, and
    a fee to be charged by the one of the plurality of ATM devices for providing the cash;
  determining, by the device, a rank for the plurality of ATM devices based on the scores for the plurality of ATM devices;
  identifying, by the device, the ATM device based on the rank;
  providing, by the device and to a second user device associated with the second user who is to deliver the cash, information identifying the ATM device and/or one or more other ATM devices, of the plurality of ATM devices, after identifying the ATM device;
  causing, by the device, a navigational application to automatically open on the second user device; and
  populating, by the device, the navigational application with information identifying a location of the ATM device and/or the one or more other ATM devices of the plurality of ATM devices to cause the navigational application to provide directions to the ATM device and/or the one or more other ATM devices of the plurality of ATM devices.

15. The method of claim 14, where providing the information identifying the ATM device or the one or more other ATM devices comprises:
  providing the information identifying the ATM device or the one or more other ATM devices after determining that the ATM device or the one or more other ATM devices are associated with a threshold score.

16. The method of claim 14, further comprising:
  generating a report related to the fee to be charged by the plurality of ATM devices; and
  providing the report to:
    a financial institution associated with one or more of the plurality of ATM devices,
    one or more of the plurality of ATM devices, or
    a server device associated with one or more of the plurality of ATM devices.

17. The method of claim 14, further comprising:
  identifying the plurality of ATM devices based on one or more factors associated with:
    the plurality of ATM devices,
    the first user device, or
    an account associated with the individual; and
  where determining the scores comprises:
    determining the scores for the plurality of ATM devices after identifying the plurality of ATM devices.

18. The method of claim 14, further comprising:
  providing a notification to the first user device based on the fee to be charged by the plurality of ATM devices; and
  where receiving the request comprises:
    receiving the request after providing the notification to the first user device.

19. The method of claim 14, further comprising:
  providing a notification to the first user device based on a proximity of the first user device and the plurality of ATM devices satisfying a threshold,
    the notification identifying the fee to be charged by the plurality of ATM devices; and
  where receiving the request comprises:
    receiving the request after providing the notification.

20. The method of claim 14, where determining the score for the one of the plurality of ATM devices comprises:
  determining at least one of:
    a weighted score for the one of the plurality of ATM devices, or
    an average score for the one of the plurality of ATM devices.

\* \* \* \* \*